March 30, 1965 R. S. WEISZ ETAL 3,176,277

NONDESTRUCTIVE READOUT MEMORY

Filed July 25, 1962

ROBERT S. WEISZ
SALVADORE ZUCCARO
MARIO SEMERARO
INVENTORS

BY Lyon & Lyon

ATTORNEYS

United States Patent Office 3,176,277

Patented Mar. 30, 1965

3,176,277

NONDESTRUCTIVE READOUT MEMORY

Robert S. Weisz, Pacific Palisades, Salvadore J. Zuccaro, Santa Monica, and Mario Semeraro, Sherman Oaks, Calif., assignors to Ampex Corporation, Redwood, Calif., a corporation of California

Filed July 25, 1962, Ser. No. 212,429
4 Claims. (Cl. 340—174)

This invention relates to magnetic data-storage systems and, more particularly, to improvements therein.

In an application for United States Letters Patent by Raymond Stuart-Williams, Serial No. 48,885, filed Aug. 11, 1960, and now U.S. Patent No. 3,162,845 which is assigned to a common assignee, there is described a Magnetic Information-Storage Device. This memory may comprise a plate of magnetic ferrite material, which has a rectangular grid of grooves laid out on one surface thereof. A first set of wires, each of which extends in a different groove along one co-ordinate of the grid, is designated as drive wires. A second set of wires, each of which extends in a different groove along the other co-ordinate of the rectangular grid, is designated as sense wires.

Should a current be applied to one of the drive wires, no voltages are induced in any of the sense wires which intersect it, in view of the fact that the wires intersect one another at right angles, and, therefore, the lines of flux which are established by current flowing in the drive wire are not cut by the sensing wires. However, should a piece of ferrite material be placed as a bridge along a diagonal at the intersection of a drive line and a sense line, then the bridging material serves to distort the path of any lines of flux which are established by a current in the drive line, so that the sense line will be cut by these lines of flux and a voltage will be induced therein. The polarity of the voltage which is induced in the sensing wire, and thus the data which is stored, is determined by the orientation of the bridging magnetic ferrite material. That is, if it is disposed along one diagonal at the intersection of a sense and drive line, the voltage will have one polarity. If it is disposed along the opposite diagonal, then the polarity of the induced voltages are reversed. This type of memory can also store data by using the presence or absence of a bridging member to represent the data stored, but the other method of operation is preferred.

An object of this invention is to provide an improved construction for the type of nondestructive readout memory which has been described.

Another object of the present invention is the provision of a memory of the type described wherein the entry of data and the change of data is simplified.

Still another object of the present invention is to provide a simple arrangement of the type described which is simplier to manufacture than its predecessor.

These and other objects of the invention may be achieved in an arrangement employing a magnetic ferrite plate having a rectangular grid of grooves on one of the surfaces. Drive lines are placed in the slots or grooves along one co-ordinate of the grid, and sensing lines are placed in the grooves along the other co-ordinate. Thus far, the structure is the same as has been described in the previously referred to application by Raymond Stuart-Williams. A plastic plate, substantially the size of the ferrite plate, has holes situated such that each hole opens on a different intersection of the grooves in the ferrite plate, when the plastic and ferrite plates are brought together. A plug of any suitable plastic material, which is sized to fit into one of the holes in the plastic plate, is provided for each hole. Each one of these plugs has embedded therein a bridging member, also made of magnetic ferrite material. The plugs are all inserted into the holes in the plastic plate, and the plastic plate is brought in contact with the ferrite plate in a manner so that the ferrite members carried by the plugs will bridge the opposed intersections on the ferrite plate. Thus, entry of data into the memory is simply achieved by properly orienting the plugs in the holes in the plastic plate and bridging the plate together in contact with the ferrite plate.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
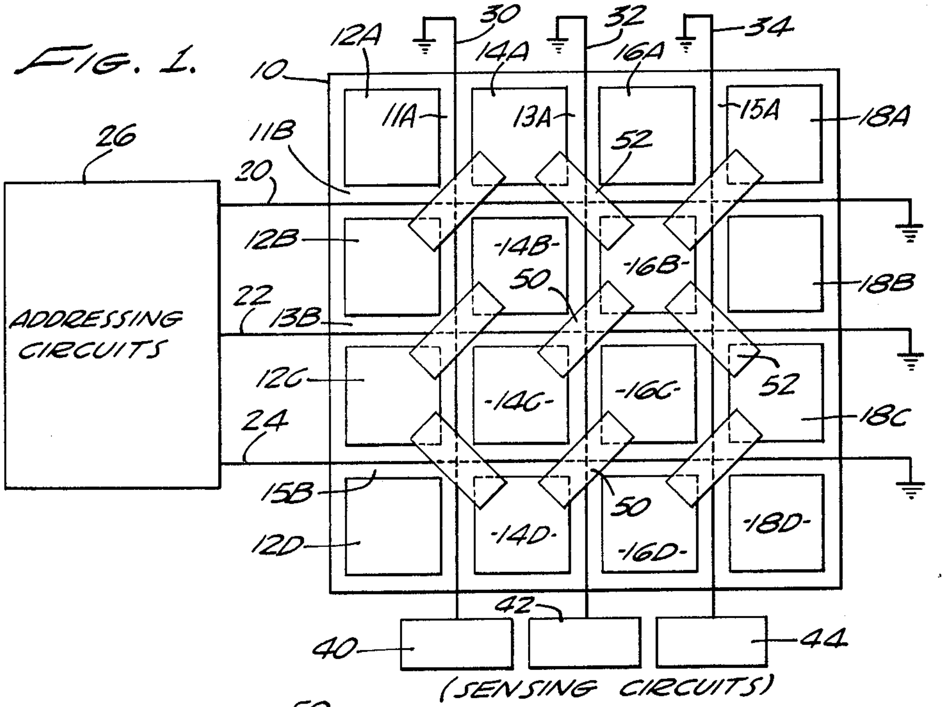
FIGURE 1 is a plan view of the appearance of a nondestructive readout memory employing a grooved ferrite plate, shown for the purpose of providing a better understanding of this invention.
Figure 2:
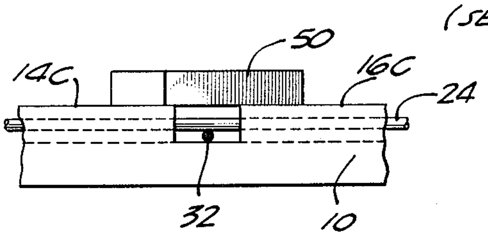
FIGURE 2 is an enlarged section of a portion of FIGURE 1.

FIGURES 1 and 2 of the drawings herein are shown in the previously mentioned application by Raymond Stuart-Williams, for a Magnetic Information-Storage Device. FIGURE 1 shows a plan view of a memory, and FIGURE 2 is an enlarged section of a portion of the memory shown in FIGURE 1. This memory comprises a magnetic ferrite plate 10, which has grooves or slots 11A, 13A, 15A, 11B, 13B, 15B laid down in a rectangular grid. As shown in the enlarged section of FIGURE 2, for convenience in maintaining the wires separated from each other, the grooves which run along one co-ordinate are not as deep as the grooves which run along the other co-ordinate. The rectangular grid of grooves provide a plurality of ferrite lands, respectively 12A, 14A, 16A, 18A, 12B, 14B, 16B, 18B, etc., which are separated from one another by these grooves. Wires, respectively 20, 22, 24, are respectively laid in the grooves 11B, 13B, 15B. Wires, respectively 30, 32, 34, are respectively laid in the orthogonally disposed groves 11A, 13A, 15A. The wires 20, 22, 24 have drive currents selectively applied thereto from addressing circuits 26. The wires 30, 32, 34 are each connected to a different sensing or voltage-detecting circuit, respectively 40, 42, 44.

FIGURE 2 shows an enlarged cross section of an intersection—for example, the one which may be defined by the lands 14C, 16C, 14D, and 16D. The line 24 crosses the intersection in one direction, and the line 32 passes orthogonally thereto. Should a pulse of current be applied to the line 24 from the selecting current source 26, no voltage would be induced in the line 32, unless the magnetic flux which is generated by the current flowing through the line is distorted so that it will cut the line 32.

Such flux distortion is provided by means of a magnetic bridging member 50, which extends between two diagonally positioned lands at the intersection. The bridging member 50, when extending along one diagonal, will cause a voltage of one polarity to be induced in the sensing line 32. If a bridging member extends along the opposite diagonal, as exemplified by the bridging member 52, then when a current pulse is applied to the line 20, a voltage of opposite polarity is induced in the line 32. The sensing circuit 42 will detect this voltage.

The memory which has been described has the property that data storage therein is made possible by the orientation of the bridging members relative to a sensing line. Also, nondestructive readout is provided. That is, no matter how often the data which is placed in the memory is sensed, it is not destroyed. It should be appreciated that where a substantially permanent type of storage memory is desired, wherein data changes do not occur too often, this type of memory is satisfactory. However, where a rapid data change is desired, or where frequent changes are desired, this memory has some limitations.

Figure 3:
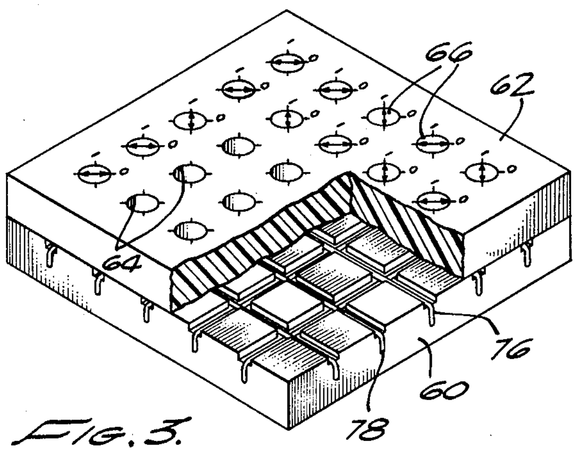
FIGURE 3 is an isometric view of an embodiment of the invention.

FIGURE 3 is a view of an arrangement in accordance with this invention for solving the difficulties of the memory which has just been described. The ferrite plate 60, which is employed, is essentially the same as the one described in connection with FIGURE 1. A grid of drive wires and sensing wires are also disposed in the grooves in the same manner as is shown in FIGURE 1. Addressing circuits and sensing circuits identical with those shown in FIGURE 1 may be employed with this memory. These are omitted from FIGURE 3, to preserve clarity in the drawings. A plastic plate 62, which has a plurality of openings 64, is placed on top of the ferrite sheet 60. Each one of the openings 64 is positioned to permit access to the region of a different one of the intersections on the ferrite sheet 60. The plastic sheet 62 has a portion thereof removed to show that the groove and wire intersections of the underlying ferrite block 60 are substantially identical with those of the block 10 shown on FIGURE 1.

Figure 4:
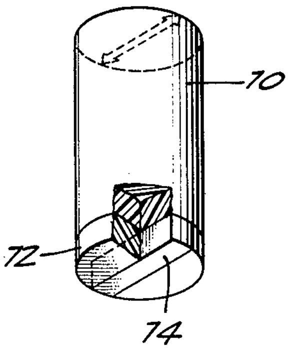
FIGURE 4 is an isometric view of a plug which is employed with this invention.

Into each one of the holes 64, 66, etc., in the plastic sheet 62 there is inserted one of the plugs, 70, shown in FIGURE 4. Each one of the plugs 70 has an end section 72, which is shaped to accommodate a magnetic bridging member 74.

Each one of the sheets 62 is prepared in advance. Into each one of its openings there is inserted one of the plugs 70 holding a ferrite bridging member 74. Each one of the holes 64, as well as the top of each of the plugs, has markings so that the ferrite bridging members can be properly oriented. For data entry, all that is necessary is to bring one of the suitably prepared plastic sheets in contact with the ferrite plate. Any suitable clamping means, not shown, may be employed to hold the sheet in place. When it is desired to write other information into a memory, then the plastic sheet is removed and another, previously prepared plastic sheet, is substituted in its place. Alternatively, each one of the plugs may be turned to provide a signal representing either a zero or a one bit when the drive line underneath is excited. Connection may be made to the drive and sense lines on the plate in any suitable manner, such as by direct solder connections or by terminating these lines in conductive tabs or terminals 76, 78, to which connection may be made by any type of suitable contacting sockets.

There has accordingly been described and shown herein a novel, useful, and improved nondestructive-readout type of magnetic memory wherein a bridging member which bridges the intersection of two orthogonally disposed wires determines the binary bit which is stored. The memory is simple to manufacture. Data entry may be accomplished in the entire memory at once by changing the plastic sheet holding the plugs and bridging members, or a bit at a time by turning each plug individually to assume the proper orientation.

We claim:

1. The improvement in data-storage device of the type comprising a plate of magnetic material having a rectangular grid of grooves, a plurality of first wires, a different one of which is disposed in a different one of the grooves which extends along a first co-ordinate, a plurality of second wires, a different one of which is disposed along a different one of the grooves which extend along a second co-ordinate of said rectangular grid, said first and second wires crossing one another at a plurality of intersections but not being magnetically coupled to one another, said improvement comprising means for providing magnetic coupling at each of said intersections comprising a sheet of nonmagnetic nonconductive material positioned adjacent to said sheet of magnetic material plate, said sheet having a plurality of holes, each of said plurality of holes being disposed over a different one of said intersections of said first and second wires, a plurality of magnetic material bridging members, and means for removably holding a different one of said bridging members within a different one of the holes in said sheet of nonmagnetic material diagonally disposed relative to an intersection of a first and second wire and in contact with said sheet of magnetic material on both sides of said intersection.

2. The apparatus as recited in claim 1 wherein each said means for holding a bridging member of magnetic material in one of said apertures comprises a plug dimensioned to fit within an aperture, said plug being made of nonmagnetic material, and a slot at one end of said plug within which said magnetic bridging member is disposed.

3. A magnetic-memory device comprising a base of magnetic material, a plurality of parallel-spaced first grooves in one surface of said base, a plurality of parallel-spaced second grooves in said one surface of said base intersecting said plurality of said first grooves at substantially right angles, a plurality of sensing wires, a different one of which is in and extends along a different one of said first grooves, a plurality of driving wires, a different one of which is in and extends along a different one of said second grooves, said sensing and driving wires crossing one another at substantially right angles and being insulated from one another, and means for storing information in said magnetic storage device including a sheet of nonmagnetic nonconductive material covering said one surface, a plurality of openings in said sheet of nonmagnetic material each of which is positioned over a different one of the intersections of said plurality of said first and second grooves, a plurality of plug means a different one of which is inserted within a different one of said plurality of apertures in said nonmagnetic sheet, each of said plug means carrying a means for establishing a magnetic-flux path across an intersection of grooves substantially along one diagonal which path has a reluctance which is low when compared with the reluctance of the path along the other diagonal.

4. A magnetic-storage device comprising a base of magnetic material, a rectangular grid of grooves on the surface of said base, said grooves separating lands of materials, a plurality of sensing wires, a different one of which is in and extends along a different one of the grooves in said rectangular grid which are parallel to one another, a plurality of driving wires a different one of which is in and extends along a different one of the grooves in said rectangular grid which are at right angles to the grooves wherein said sensing wires are disposed, said sensing and driving wires crossing each other substantially at right angles and being insulated from one another, a nonmagnetic nonconductive sheet adjacent to said base of magnetic material and extending over the surface thereof, said nonmagnetic nonconductive sheet having a plurality of openings therethrough which are disposed to afford access to each of the intersections of the grooves in said rectangular grid, a plurality of plug members a different one of which is rotatably inserted into a different one of said plurality of openings, each of said plug members carrying a bridging member made of magnetic material, said bridging member being positioned at the end of the plug member for contacting diagonally opposed lands at an intersection of the grooves, said plug being rotatable for affording a selection of the diagonal position of the bridging member.

References Cited by the Examiner

UNITED STATES PATENTS

| | | | |
|---|---|---|---|
| 2,825,891 | 3/58 | Duinker | 340—174 |
| 3,027,548 | 3/62 | Vaughan | 340—174 |
| 3.061,821 | 10/62 | Gribble et al. | 340—174 |
| 3,102,999 | 9/63 | Bernemyr et al. | 340—174 |

IRVING L. SRAGOW, *Primary Examiner.*